United States Patent
Fan et al.

(10) Patent No.: US 11,837,229 B1
(45) Date of Patent: Dec. 5, 2023

(54) INTERACTION DATA AND PROCESSING NATURAL LANGUAGE INPUTS

(71) Applicant: Amazon Technologies, Inc., Seattle, WA (US)

(72) Inventors: Xing Fan, Redmond, WA (US); Saurabh Gupta, Redmond, WA (US); Chenlei Guo, Redmond, WA (US); Eunah Cho, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/363,387

(22) Filed: Jun. 30, 2021

(51) Int. Cl.
*G06F 16/33* (2019.01)
*G10L 15/22* (2006.01)
*G06N 5/02* (2023.01)
*G10L 15/14* (2006.01)
*G06F 16/36* (2019.01)

(52) U.S. Cl.
CPC ............... *G10L 15/22* (2013.01); *G06N 5/02* (2013.01); *G10L 15/144* (2013.01); *G06F 16/3338* (2019.01); *G06F 16/367* (2019.01); *G10L 2015/223* (2013.01)

(58) Field of Classification Search
CPC . G06F 16/3338; G06F 16/367; G06F 3/04842
See application file for complete search history.

(56) References Cited

U.S. PATENT DOCUMENTS

| | | | | |
|---|---|---|---|---|
| 2005/0267871 | A1* | 12/2005 | Marchisio | G06F 16/3338 |
| 2007/0143624 | A1* | 6/2007 | Steeves | G06F 21/36 |
| | | | | 713/184 |
| 2007/0198267 | A1* | 8/2007 | Jones | H04M 3/4936 |
| | | | | 707/E17.062 |
| 2009/0164441 | A1* | 6/2009 | Cheyer | G06F 16/334 |
| 2015/0334204 | A1* | 11/2015 | Bilinski | G06F 3/04842 |
| | | | | 715/748 |

* cited by examiner

*Primary Examiner* — Feng-Tzer Tzeng
(74) *Attorney, Agent, or Firm* — PIERCE ATWOOD LLP

(57) ABSTRACT

Techniques for determining and using interaction affinity data are described. Interaction affinity data may indicate a latent affinity between information corresponding to an interaction, such as, intents, entities, device type from which a user input is received, domain, etc. A system may use the interaction affinity data to determine an alternative input representation for a spoken input to cause output of a desired response to the spoken input. The system may also use the interaction affinity data to recommend an action to a user.

18 Claims, 11 Drawing Sheets

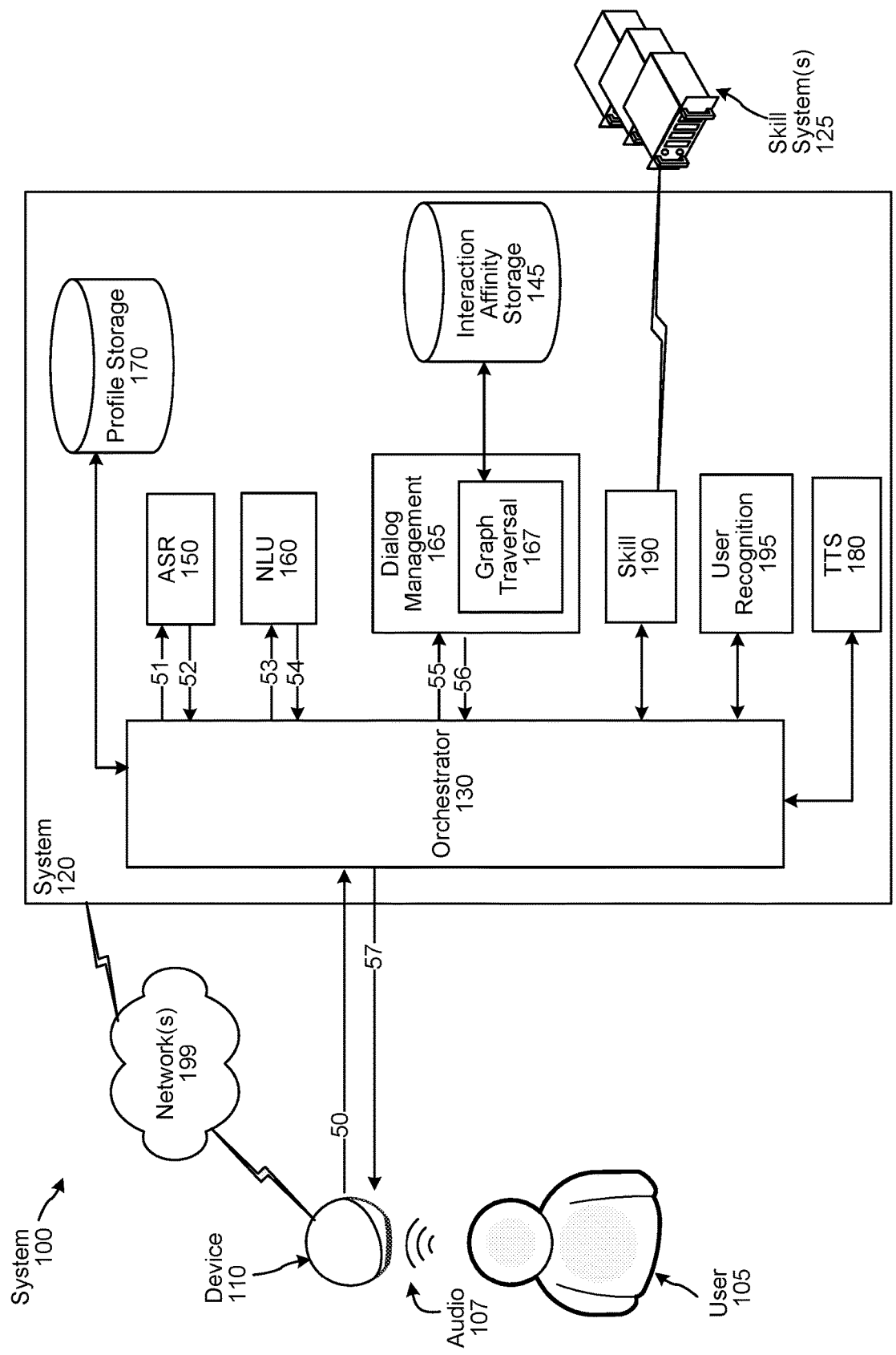

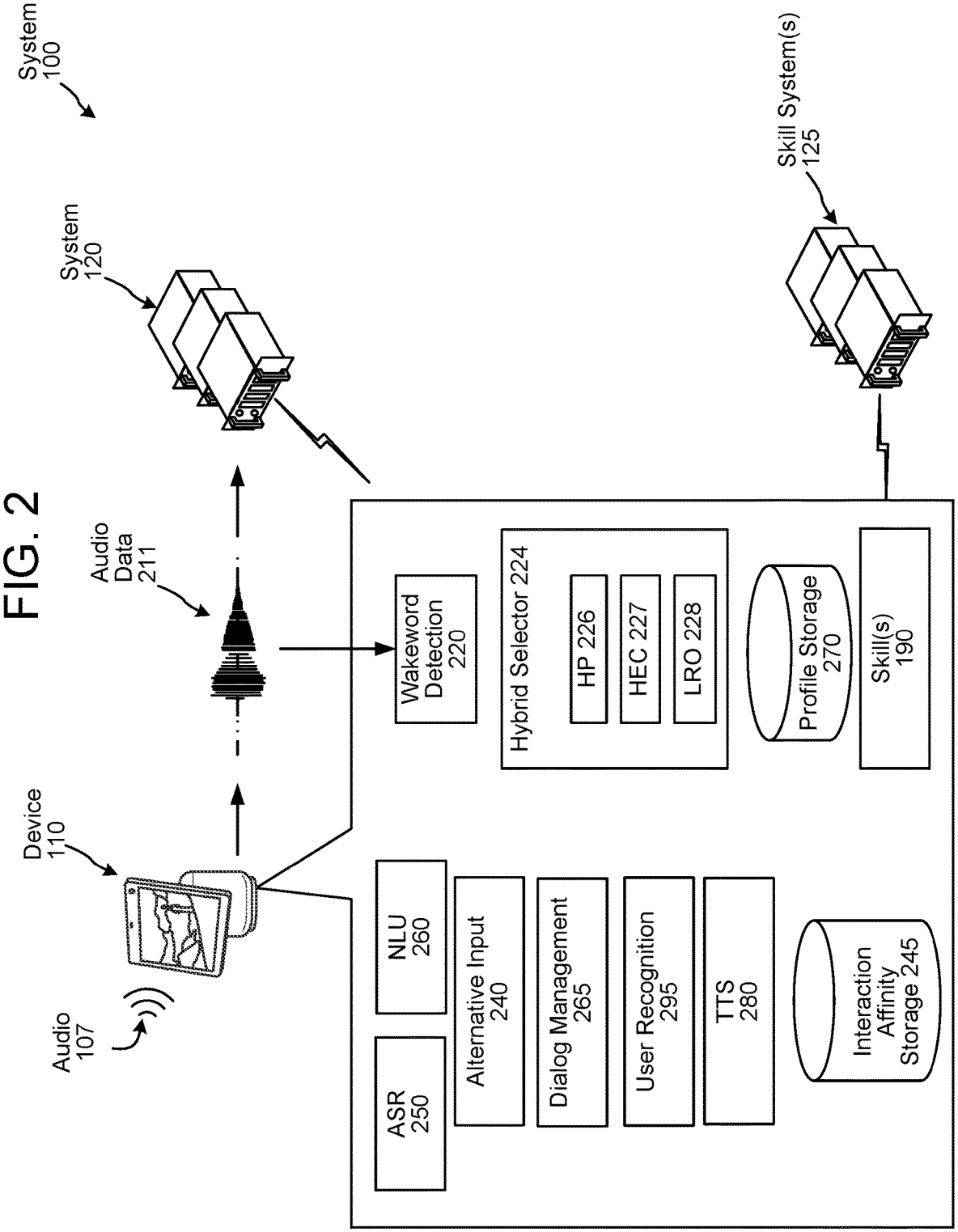

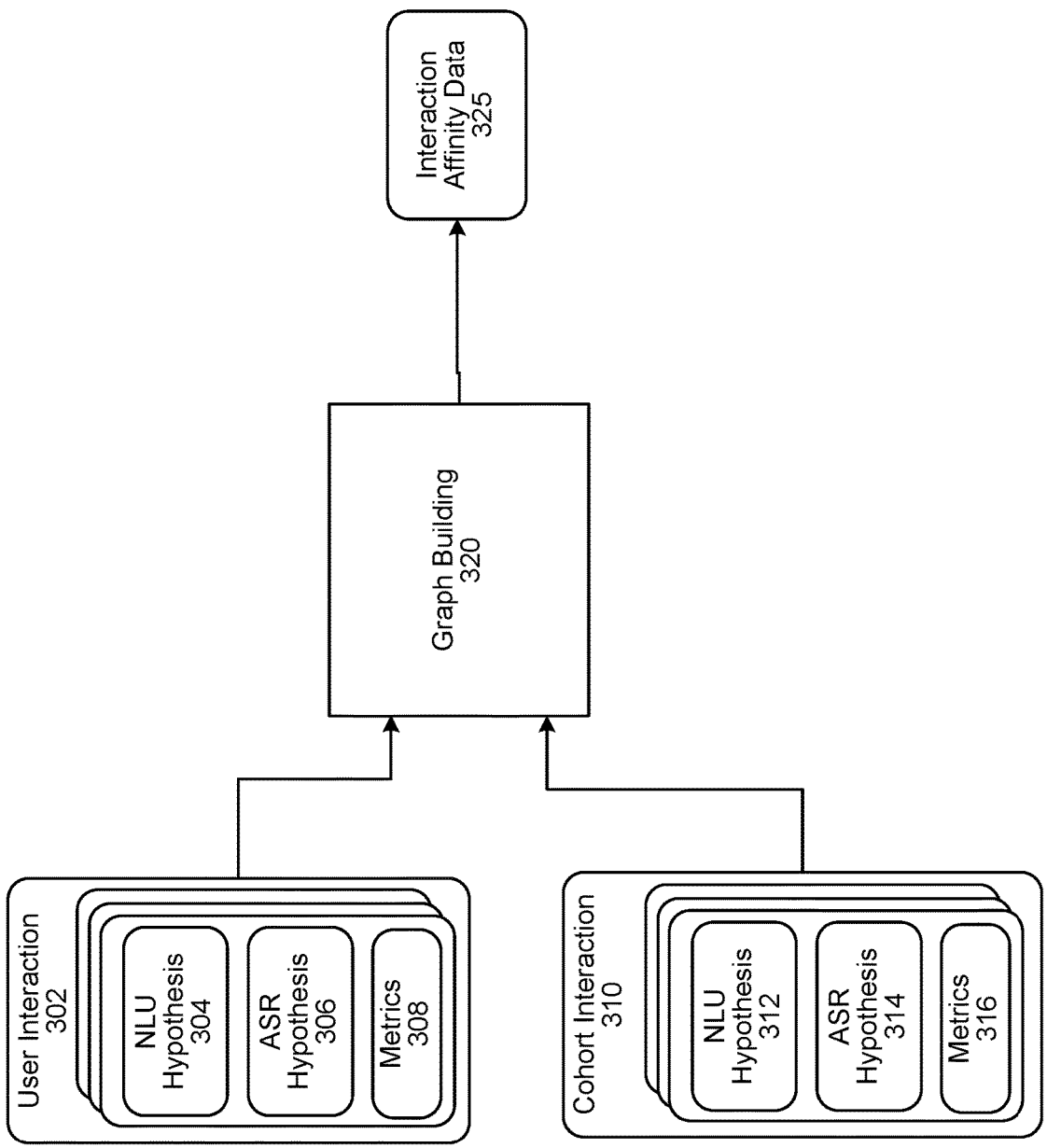

INTERACTION DATA AND PROCESSING NATURAL LANGUAGE INPUTS

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating an example configuration of a system for using interaction affinity data for determining a system response in a dialog, according to embodiments of the present disclosure.

FIG. 2 is a conceptual diagram illustrating components that may be included in a device, according to embodiments of the present disclosure.

FIG. 3 is a conceptual diagram illustrating a graph building component to generate interaction affinity data, according to embodiments of the present disclosure.

DETAILED DESCRIPTION

Figure 1A:
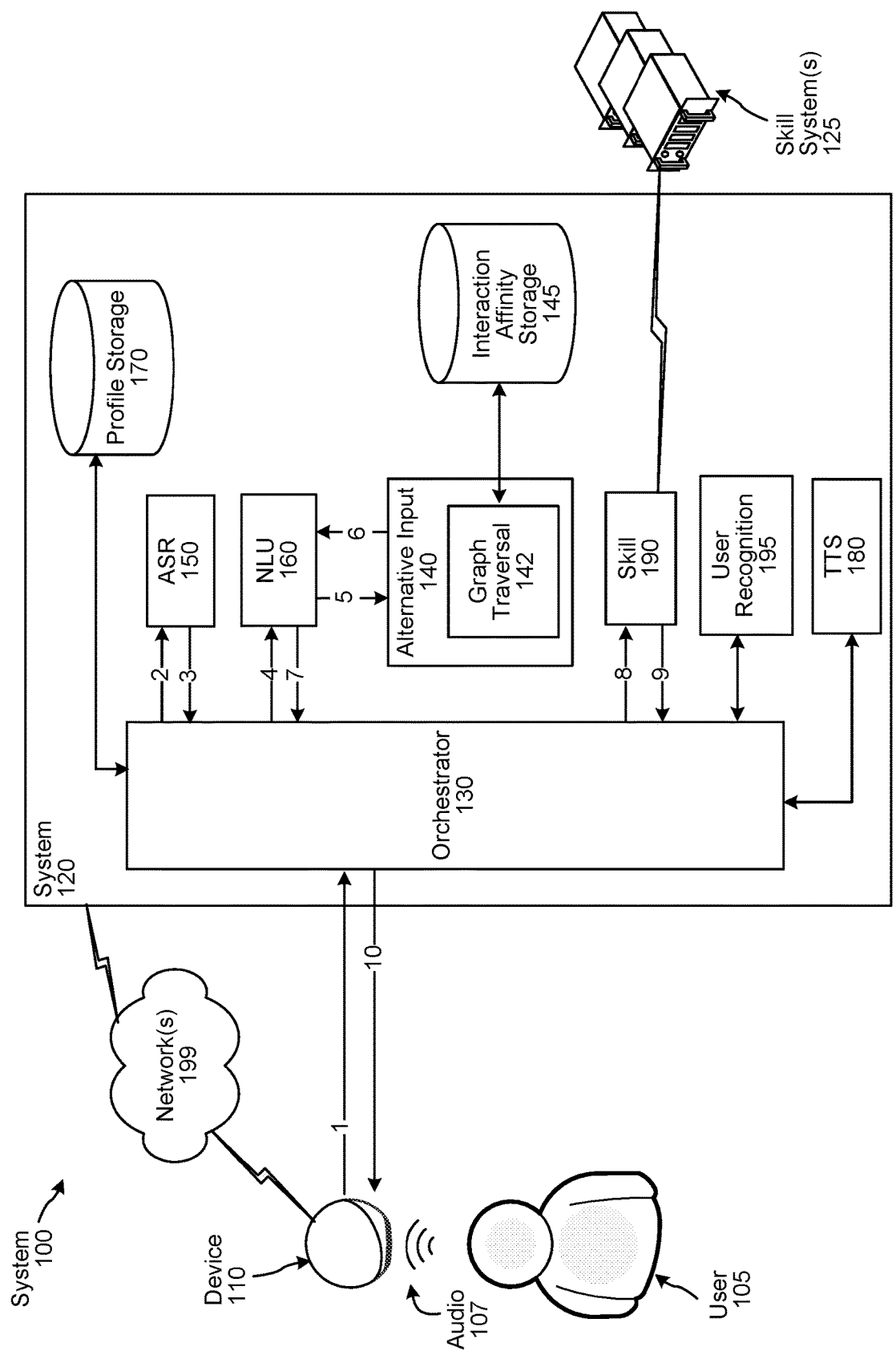
FIG. 1A is a conceptual diagram illustrating an example configuration of a system for using interaction affinity data to determine an alternative representation for a spoken input, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music by [artist]," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

An interaction for the system may involve a user providing a natural language input and the system generating a response. Interaction data for the interaction may include ASR data, if the natural language input is a spoken input, NLU data (including an intent and one or more entities corresponding to the natural language input), the system response, and potentially other data. The present disclosure relates to techniques for determining an affinity between pieces of information included in the interaction data. An affinity, as used herein, refers to an association combined with a preference between two pieces of information. In some cases, the affinity may indicate a preference of a user or more users with respect to the two pieces of information. The system may determine an explicit affinity based on a user input received from a user. For example, the user input may be "play music by [artist] in the kitchen," and the system may determine the user having an explicit affinity for listening to music by the indicated artist in the kitchen. The system may also determine a latent affinity, which may be an affinity that is not explicitly expressed by the user and may be derived (inferred) from implicit information included in the user interactions with the system. For example, a latent affinity between a song and an artist (as both being included in the same user input for example) may indicate a preference of a user for the song by the particular artist (rather than the same song title by a different artist). As another example, a latent affinity between an intent to play music and a device name may indicate a preference of a user for playing music using that particular device.

In determining a latent affinity, the system determines an association and a preference between two pieces of information based on the both of them being included in the same user input, or both of them being included in the same dialog session. For example, a first user input from a user may correspond to a first entity, a subsequent user input from the user may correspond to a second entity, and the system may determine a latent affinity between the first entity and the second entity based on the first and subsequent user input. In some embodiments, the latent affinity may be based on a number of associations or a frequency of associations (or number of associations within a period of time) of such user inputs are received by the system indicating that users tend to provide user inputs associating particular entities in a subsequent manner. Other types of information that the system determines a latent affinity between may include intent, NLU hypotheses, device type, grammar of the user input, syntax of the user input, and domain. Latent affinity and explicit affinity information when based on user interactions with a system is referred to herein as interaction affinity data.

In some embodiments, the system also determines the type of affinity between two pieces of information. The types of affinity may be co-occurrence, rephrase, recommendation, and cohort. A co-occurrence affinity type may be based on the pieces of information being present in the same user input or in the same dialog session. A rephrase affinity type may be based on the pieces of information being present in a pair of user inputs, where the first user input may be an initial input and the subsequent user input may be a rephrase or a repeat of the initial user input. A recommendation affinity type may be based on the system recommended an action to the user in response to a user input, and the user confirming performance of the recommended action. In some embodiments, the co-occurrence, rephrase and recommendation affinity types may be based on interaction data for a specific user. A cohort affinity type may be based on interaction data for other users that may be similar to the user (e.g., may have similar interests, similar demographic information, similar sport team affiliations, similar job types, etc.).

In some embodiments, the system uses the interaction affinity data to determine an alternative input representation for a spoken input. In some cases, the system may misunderstand what the user said, and may output an undesired response. For example, the system may misunderstand which song the user requested, and outputs another song different than the one requested. Based on the interaction affinity data, the system can determine an alternative input representation for the spoken input, and output a desired response for the spoken input using the alternative input representation.

In some embodiments, the system uses the interaction affinity data to determine a recommended action for a user. In some cases, the system, in addition to outputting a response to the user input, can also output a recommended action based on the user input. For example, if the user requests output of a first song by an artist, then the system may recommend, to the user, a second song by the artist. The system can determine such a recommendation based on the latent affinity included in the interaction affinity data indicating the user or other similar users frequently requesting output of the second song by the artist.

In some embodiments, the interaction affinity data may be represented as a graph, and the system can traverse the graph to determine the alternative input representation or the recommended action. The graph can include a node for each piece of information derived from the interaction data, such as, one or more NLU hypothesis nodes, one or more intent nodes, one or more entity nodes, one or more device type nodes, one or more grammar nodes, one or more syntax nodes, and one or more domain nodes. An affinity between the nodes can be represented by an edge, and the edge can be labeled to indicate the type of affinity.

Using the interaction affinity data, the system can determine an alternative input representation and a recommended action at a granular level. For example, the system can determine a different entity for the alternative input representation (as compared to an entity derived from the original user input), instead of determining an entirely different alternative input representation (e.g., also including a new intent, etc.). Additionally, the interaction affinity data can be updated to include new user inputs or new pieces of information. For example, a new song by an artist already included in the interaction affinity data can be added by adding a node corresponding to the new song and connecting the artist node with the new song node using an edge. As such, if a spoken input requests output of the new song, and the system may misunderstand (during ASR processing) the words spoken by the user because the system has yet to receive a user input including the new song, then the system can determine an alternative input representation using the new song node to output the desired response to the user. The interaction affinity data includes latent affinities inferred (implicitly derived) from user interactions with the system 120.

The techniques of the present disclosure result in an improved user experience. For example, the user may receive more desired system responses based on the system determining alternative input representations when the system misunderstands spoken inputs. As another example, the user may receive more desired system recommended actions based on the frequency of such action being performed in response to inputs by the user or other similar users.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1A shows a system 100 configured to use interaction affinity data to determine an alternative input representation. FIG. 1B shown another embodiment of the system 100 configured to use interaction affinity data to determine a system response in a dialog. As shown in FIGS. 1A and 1B, the system 100 may include a device 110, local to a user 105, and in communication with a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, a NLU component 160, and one or more skill components 190. The system 120 may also include a profile storage 170, a TTS component 180, and a user recognition component 195 to facilitate processing of users inputs and generating outputs. The system 120 may be in communication with a skill system(s) 125.

As shown in FIG. 1A, in some embodiments, the system 120 may include an alternative input component 140 configured to determine an alternative input representation for a user input spoken by a user. In some cases, certain spoken inputs may be misrecognized by the ASR component 150, resulting in performance of an action that is undesired by the user or unresponsive to the user input. The alternative input component 140 may determine an alternative input representation (e.g., a rephrased input, a rewrite of the input, etc.), for the spoken input, that results in a desired action being performed. As described below, the alternative input component 140 may use stored data, such as, interaction affinity data to determine the alternative input representation.

As shown in FIG. 1B, in some embodiments, the system 120 may include a dialog management component 165 configured to determine a system response, to a user input, that may include additional or supplemental information. In some embodiments, the dialog management component 165 may recommend additional or other actions that the user 105 can ask the system 120 to perform. For example, for a user input from the user 105 requesting output of a first song by an artist, the dialog management component 165 may recommend a second song by the artist to the user 105. As a further example, for a user input requesting today's temperature, the dialog management component 165 may ask the user 105 if he/she wants to hear about today's humidity level. The system 120 may output the recommendation as included in the system response to a user input (e.g., the system may output "here is your requested song. Should I add [second song] to the play queue?"). The system 120 may output the recommendation after the system has finished outputting a response to a user input (e.g., after the requested song has been played, the system may output "would you like to listen to [second song]?"). In some embodiments, the dialog management component 165 may a turn-based dialog between the user 105 and the system 120, and may recommend additional or other actions based on a goal of the dialog. As described below, the dialog management component 165 may use stored data, such as, interaction affinity data to determine a system response to a user input including a recommended action.

Referring to FIG. 1A, the user 105 may speak an input, and the device 110 may capture audio 107 representing the spoken input. For example, the user 105 may say "Alexa, play [first song name] by [artist]." The device 110 may send (step 1) audio data corresponding to the spoken input to the system 120 for processing. The orchestrator component 130 may receive the input data from the device 110. The orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the NLU component 160, and the NLU component 160 may process the ASR data to determine NLU data (e.g., intent data, entity data, one or more NLU hypotheses including intent data, entity data and corresponding confidence scores, etc.) corresponding to the spoken input.

The NLU component 160 may send (step 5) the ASR data and the NLU data corresponding to the spoken input to the alternative input component 140. Before determining an alternative input representation for the spoken input, the alternative input component 140, in some embodiments, may determine whether or not the system 120 will output an undesired response to the spoken input. The alternative input component 140 may determine, using the ASR data and/or the NLU data, that the system 120 is going to output an undesired response to the spoken input. The alternative input component 140 may make this determination based on one or more confidence scores included in the ASR data or the NLU data not satisfying a condition (e.g., being below a threshold value) indicating that the ASR component 150 or the NLU component 160 is not confident in its processing. The alternative input component 140 may determine that the system 120 will output an undesired response based on past interaction data indicating the user 105 (or other users) have received undesired responses in the past when the user input corresponds to the ASR data and the NLU data for the instant spoken input. Other techniques may be used by the alternative input component 140 to determine that the system 120 will output an undesired response to the spoken input.

In some embodiments, the alternative input component 140 may determine an alternative input representation for the spoken input without determining whether or not the system 120 will output an undesired response.

Figure 4:
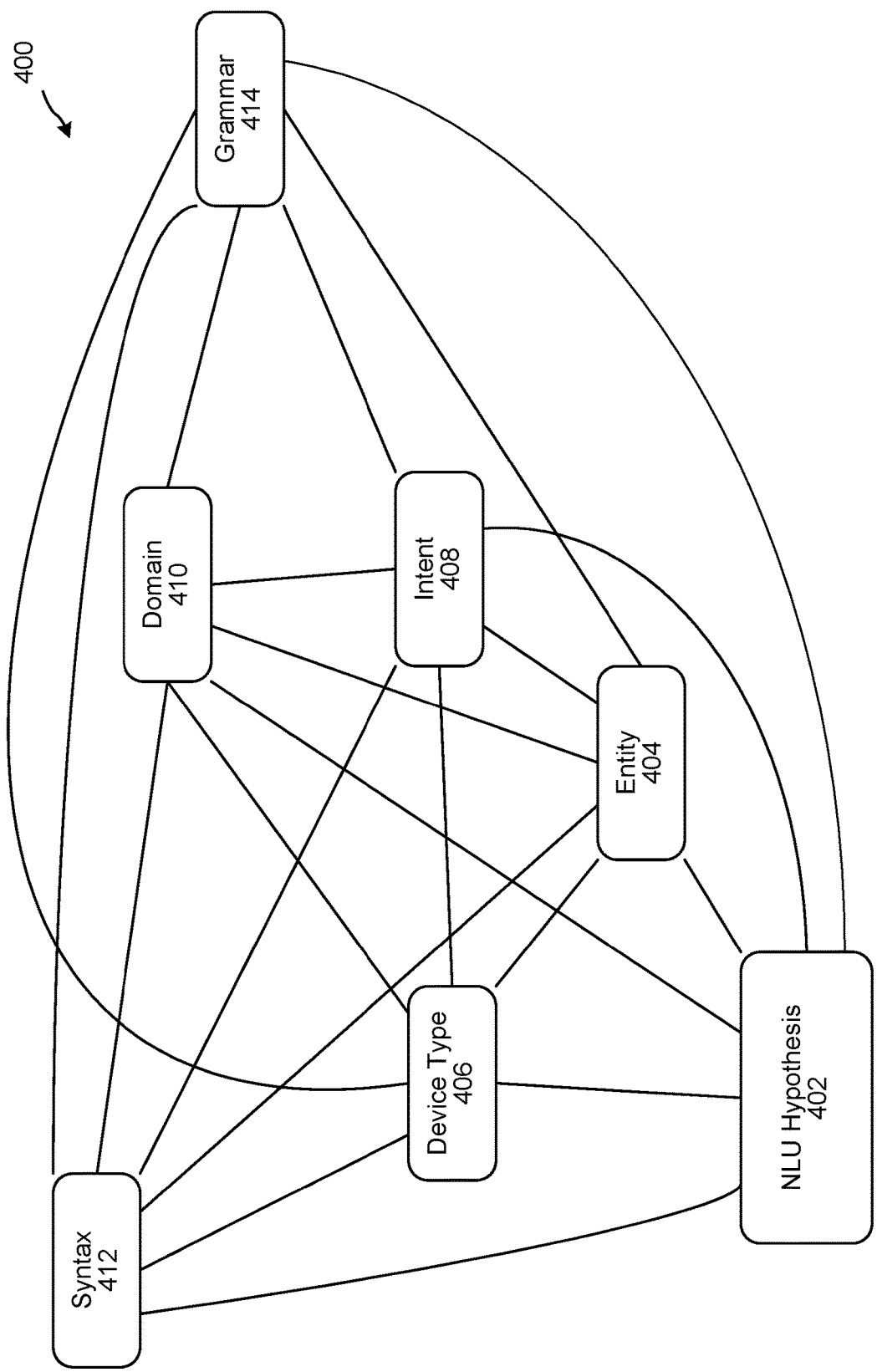
FIG. 4 illustrates example data included in the interaction affinity data, according to embodiments of the present disclosure.
Figure 5:
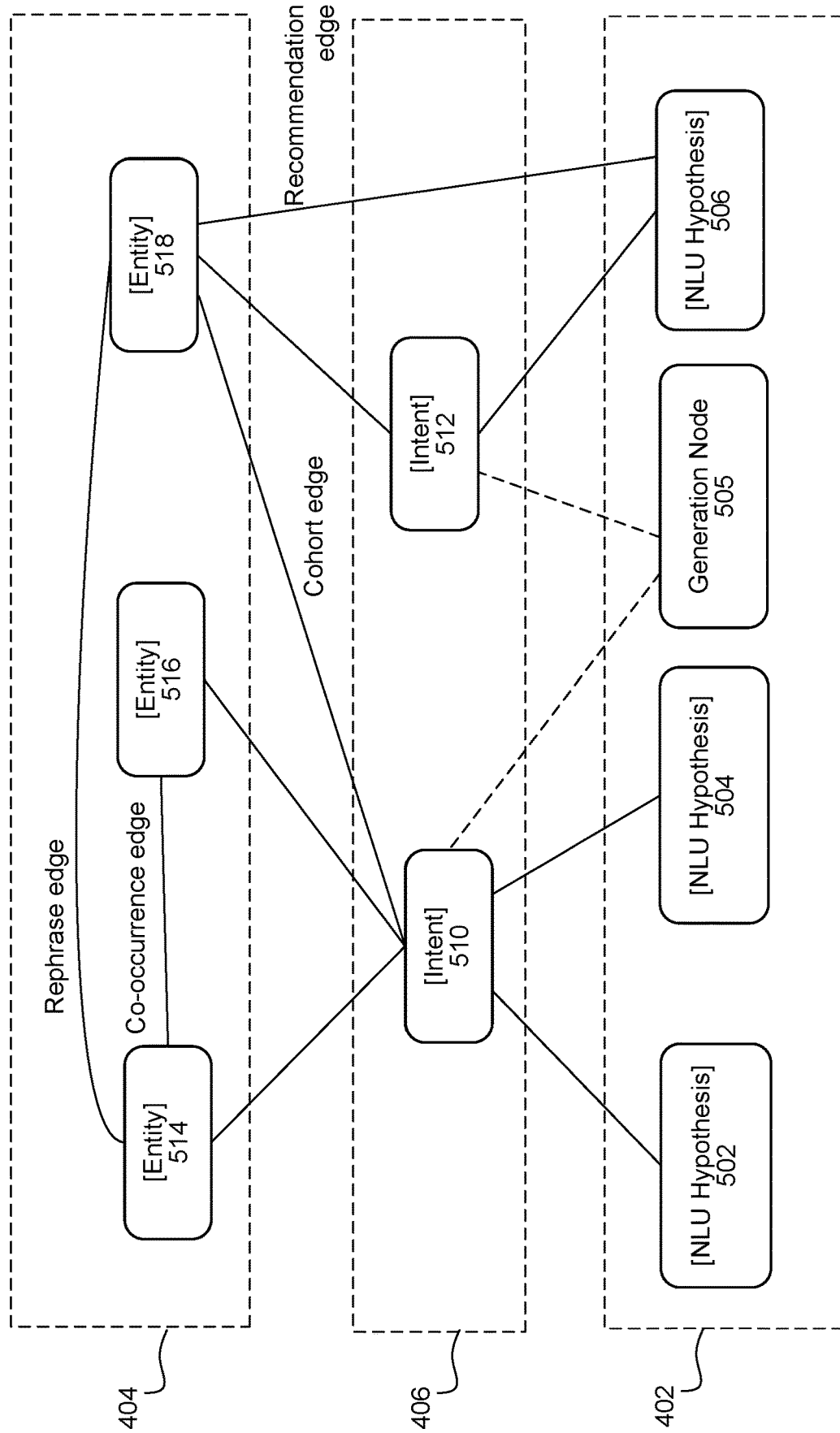
FIG. 5 illustrates example nodes and edges included in the interaction affinity data, according to embodiments of the present disclosure.

The alternative input component 140 may determine one or more alternative input representations using the ASR data and/or the NLU data corresponding to the spoken input. The alternative input component 140 may use interaction affinity data, stored at an interaction affinity storage 145, for determining the alternative input representation(s). The interaction affinity data may indicate an explicit and latent affinity between various data included in interactions. For example, the interaction affinity data may indicate a latent affinity between a first entity (e.g., a first song name) and a second entity (e.g., a second song name) based on multiple users and/or the user 105 during multiple interactions providing user inputs including the first entity and the second entity (e.g., the user 105 requests output of the first song name and the second song name during the same interaction or same dialog session). In some embodiments, the interaction affinity data may be represented as a graph, and as shown in FIGS. 4 and 5, such latent affinity, between entities for example, may be indicated by connecting, with an edge, a first entity node (node 514) corresponding to the first entity to a second entity node (node 516) corresponding to the second entity. As another example, the interaction affinity data may indicate a latent affinity between a first intent (e.g., <PlaySongIntent>) and a second intent (e.g., <AddToPlayQueueIntent>) based on multiple users and/or the user 105 during multiple interactions providing user inputs including the first intent and the second intent (e.g., the user 105 requests playback of a song, and asks the song to be added to a play queue during the same interaction or same dialog session). The interaction affinity data may indicate a latent affinity between different types of data as well, for example, between an intent and an entity (e.g., the user 105 requests output of a song (entity), and asks the song to be added to a play queue (<AddToPlayQueueIntent>) during the same interaction or same dialog session). The interaction affinity data may indicate an association combined with a preference between NLU hypotheses, entities, intents, device types, grammar, domains, and syntax of a user input.

Based on such interaction affinity data, the alternative input component 140 may determine an alternative input representation for the spoken input based on there being a latent affinity between the data corresponding to the spoken input and the data included in the interaction affinity data. That is, the alternative input component 140, using the interaction affinity data, may determine what the user 105 likely said. For example, the spoken input may include a first entity (as determined by the ASR component 150 and the NLU component 160), based on the interaction affinity data indicating a latent affinity between the first entity and a second entity, the alternative input component 140 may determine that the spoken input likely corresponds to the second entity, and may determine the alternative input representation to include the second entity. As another example, the spoken input may correspond to a first intent (as determined by the ASR component 150 and the NLU component 160), based on the interaction affinity data indicating a latent affinity between the first intent and a second intent, the alternative input component 140 may determine that the spoken input likely corresponds to the second intent, and may determine the alternative input representation to correspond to the second intent. As another example, the spoken input may correspond to a first entity and a first intent (as determined by the ASR component 150 and the NLU component 160), based on the interaction affinity data indicating a latent affinity between the first entity and a second intent, the alternative input component 140 may determine that the spoken input likely corresponds to the second intent, and may determine the alternative input representation to correspond to the second intent. As such, the alternative input component 140, using the interaction affinity data, can determine an alternative input representation based on affinities between different types of data (e.g., a latent affinity between an intent and an entity, a latent affinity between an intent and a device type, a latent affinity between an entity and a device type, a latent affinity between an intent and a syntax, etc.).

As a non-limiting example, the user 105 or other users may often use a particular syntax for a user input when the user input corresponds to a particular intent. The interaction affinity data may include such a latent affinity (e.g., using nodes and edges as shown FIG. 5). For a spoken input that has the particular syntax, the alternative input component 140 may determine an alternative input representation as corresponding to the particular intent, based on the latent affinity included in the interaction affinity data.

The interaction affinity data, in some embodiments, may be represented as a graph (described below in relation to FIGS. 4 and 5). The alternative input component 140 may include a graph traversal component 142 that may traverse the graph, using the ASR data and the NLU data corresponding to the spoken input, to determine one or more alternative input representations for the spoken input. The graph traversal component 142 may take as input text data or token data representing the spoken input. The graph traversal component 142 may determine to modify a portion of the spoken input. For example, based on processing the interaction affinity data, the graph traversal component 142 may determine to modify the entity included in the NLU data corresponding to the spoken input (e.g., [first song name]) to another entity (e.g., [second song name]). As a further example, the intent included in the NLU data corresponding to the spoken input (e.g., <TurnOnIntent>) may be modified to another intent (e.g., <PlayMusicIntent>).

The alternative input component 140 may send (step 6) the alternative input representation(s) for the spoken input to the NLU component 160. The alternative input representation(s) may be text data or token data corresponding to an entire input, such that the alternative input representation(s) may be used by the NLU component 160, like an ASR hypothesis, to determine an NLU hypothesis corresponding to the alternative input representation. In some embodiments, the alternative input component 140 may also send, to the NLU component 160, intent data, entity data or a NLU hypothesis corresponding to the alternative input representation(s).

The NLU component 160 may determine a merged list of NLU hypotheses, that may include NLU hypotheses corresponding to the spoken input (determined by the NLU component 160) and NLU hypotheses corresponding to the alternative input representation(s). In some embodiments, the NLU component 160 may select the alternative input representation for further processing. As such, the NLU component 160 may send (step 7) NLU data to the orchestrator component 130, where the NLU data may include intent data and entity data corresponding to the alternative input representation for the spoken input. The NLU component 160 may also determine a skill component 190 capable of processing the intent data and the entity data corresponding to the alternative input representation, and may send a skill identifier for the skill component 190 to the orchestrator component 130. In other embodiments, the NLU component 160 may send the merged list of NLU hypotheses to the orchestrator component 130.

The orchestrator component 130 may send (step 8) the intent data and the entity data corresponding to the alternative input representation to the skill component 190 to perform an action responsive to the alternative input representation. The skill component 190 may determine output data, using the intent data and the entity data corresponding to the alternative input representation, and may send (step 9) the output data to the orchestrator component 130. The output data may be a natural language output (e.g., text data, structured data, etc.) that may be processed by the TTS component 180 to generate audio data representing synthesized speech. The output data may be other type of data (e.g., audio data corresponding to music, video data corresponding to a movie, text data corresponding to weather information, image data corresponding to weather information, etc.). The orchestrator component 130 may send (step 10) the output data to the device 110 for output to the user 105 in response to the spoken input. As such, the system 120 outputs data corresponding to an alternative input representation in response to a spoken input.

FIG. 1B illustrates using interaction affinity data for determining a system response, to a user input, including a recommended action. The user 105 may speak an input, and the device 110 may capture audio 107 representing the spoken input. For example, the user 105 may say "Alexa, play [first song name] by [artist]." In other examples, the user 105 may provide another type of input (e.g., selection of a button, selection of displayed graphical interface elements, may perform a gesture, etc.). The device 110 may send (step 50) audio data (or other type of input data, such as, image data, text data, etc.) corresponding to the user input to the system 120 for processing. The orchestrator component 130 may receive the input data from the device 110. In the case the input data is audio data, the orchestrator component 130 may send (step 51) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 52) the ASR data to the orchestrator component 130.

The orchestrator component 130 may send (step 53) the ASR data to the NLU component 160, and the NLU component 160 may process the ASR data to determine NLU data (e.g., intent data, entity data, one or more NLU hypotheses including intent data, entity data and corresponding confidence scores, etc.) corresponding to the user input. The NLU component 160 may send (step 54) the NLU data to the orchestrator component 130.

The orchestrator component 130 may send (step 55) the ASR data and the NLU data corresponding to the user input to the dialog management component 165. In some embodiments, the dialog management component 165 may be configured to determine a recommended action, for example, using the ASR data and the NLU data. To determine the recommended action, the dialog management component 165 may use the interaction affinity data from the interaction affinity storage 145. As described above, the interaction affinity data may indicate a latent affinity between various data included in interactions. For example, the interaction affinity data may indicate a latent affinity between a first entity (e.g., a first song name) and a second entity (e.g., a second song name) based on multiple users and/or the user 105 during multiple interactions providing user inputs including the first entity and the second entity (e.g., the user 105 requests output of the first song name and the second song name during the same interaction or same dialog session). In some embodiments, the interaction affinity data may be represented as a graph, and as shown in FIG. 5, such latent affinity, between entities for example, may be indicated by connecting a first entity node (node 514) corresponding to the first entity to a second entity node (node 516) corresponding to the second entity. As another example, the interaction affinity data may indicate a latent affinity between a first intent (e.g., <PlaySongIntent>) and a second intent (e.g., <AddToPlayQueueIntent>) based on multiple users and/or the user 105 during multiple interactions providing user inputs including the first intent and the second intent (e.g., the user 105 requests playback of a song, and asks the song to be added to a play queue during the same interaction or same dialog session). As described herein, the interaction affinity data may indicate a latent affinity between different types of data as well, for example, between an intent and an entity (e.g., the user 105 requests output of a song (entity), and asks the song to be added to a play queue (<AddToPlayQueueIntent>) during the same interaction or same dialog session).

Based on such interaction affinity data, the dialog management component 165 may determine to recommend an action corresponding to an entity and/or an intent connected to the entity and/or intent corresponding to the user input. That is, the dialog management component 165, using the interaction affinity data, may determine which action users or the user 105 frequently request the system 120 to perform in conjunction with, following or preceding the action requested in the current user input. As described herein, the interaction affinity data may also indicate a latent affinity between entities, intents, device types, grammar, domains and syntax of user input.

The dialog management component 165 may include a graph traversal component 167 configured to take as input ASR data and NLU data corresponding to a user input, traversing a graph representing the interaction affinity data, and determining a recommended action based on the current user input. Details on how the graph traversal component 167 may traverse the graph are described below in relation to FIGS. 4 and 5. The recommended action may be represented as a NLU hypothesis including an intent and one or more entities. The output of the graph traversal component 167 may be a portion of the NLU hypothesis or may be an entire NLU hypothesis. In cases where the graph traversal component 167 outputs a portion of the NLU hypothesis, the dialog management component 165 may determine the recommended action using information corresponding to the current user input. For example, the current user input may correspond to an intent and a first entity, the graph traversal component 167 may output a second entity for the recommended action, and the dialog management component 165 may determine the entire recommended action as corresponding to the intent of the current user input and the second entity. As another example, the current user input may correspond to a first intent and an entity, the graph traversal component 167 may output a second intent for the recommended action, and the dialog management component 165 may determine the entire recommended action as corresponding to the second intent and the entity of the current user input.

The dialog management component 165 may send (step 56) output data representing the recommended action to the orchestrator component 130. The output data may be text data or structured data representing a natural language output corresponding to the recommended action. For example, for the user input "play [first song] by [artist]", the recommended action may be "do you want to listen to [second song] by [artist]?" The output data may be processed by the TTS component 180 to determine audio data representing synthesized speech, and the orchestrator component 130 may send (step 57) the audio data to the device 110 for output. In other cases, the orchestrator component 130 may send (step 57) the output data to the device 110, and the device 110 may display text included in the output data.

Although FIG. 1A shows the graph traversal component 142 as included in the alternative input component 140, it should be understood that the graph traversal component 142 may be implemented outside of the alternative input component. Similarly, although FIG. 1B shows the graph traversal component 167 included in the dialog management component 165, it should be understood that the graph traversal component 167 may implemented outside of the dialog management component 165. In other embodiments, the system 120 may include one graph traversal component (instead of two separate ones) implemented outside of the alternative input component 140 and the dialog management component 165. In such embodiments, each of the alternative input component 140 and the dialog management component 165 may send ASR data and NLU data to the graph traversal component for processing using the interaction affinity data included in the interaction affinity storage 145, and the graph traversal component may send the results of processing to the requesting component.

The system 120 may be configured to respond to the user across multiple exchanges between the user 105 and the system 120. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience. The dialog management component 165 may determine, as described above in relation to FIG. 1B, a recommended action as a system response in a dialog.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

In some embodiments, the interaction affinity data from the interaction affinity storage 145 may be used by the ASR component 150 to add to, rerank, rescore, or otherwise supplement the ASR N-best list generated by the ASR component 150. The ASR component 150 may traverse the interaction affinity data using a ASR hypothesis (e.g., the 1-best ASR hypothesis or another one in the N-best list). Based on the traversal, the ASR component 150 may update a confidence score for a ASR hypothesis, may update text or token data in the ASR hypothesis or may add another ASR hypothesis to the N-best list. For example, the ASR component 150 may determine the user's 105 latent affinity for an entity, and may update a token to correspond to that entity or may increase the confidence score of the ASR hypothesis that includes that entity. The ASR component 150 may use latent affinities between two or more entities to supplement the ASR N-best list. For example, one of the ASR hypothesis may include a first entity and a second entity, using the interaction affinity data the ASR component 150 may determine a latent affinity, for the user 105, between the first entity and third entity (which may sound similar to the second entity), and the ASR component 150 may add another ASR hypothesis including the first entity and the third entity, or update an existing ASR hypothesis to include the third entity instead of the second entity.

The system 120 may use other components illustrated in FIGS. 1A and 1B. The various components shown in FIGS. 1A-1B may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220 (shown in FIG. 2). The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio, to the system 120. The audio data 211 may include the detected wakeword, or the device 110 may remove the portion of the audio data, corresponding to the detected wakeword, prior to sending the audio data 211 to the system 120.

Referring to FIGS. 1A and 1B, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens corresponding subwords, words, characters, etc. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 211 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 211 to determine NLU output data.

The SLU component may be equivalent to a combination of the ASR component 150 and the NLU component 160. Yet, the SLU component may process audio data 211 and directly determine the NLU output data, without an intermediate step of generating ASR output data. As such, the SLU component may take audio data 211 representing a spoken natural language input and attempt to make a semantic interpretation of the spoken natural language input. That is, the SLU component may determine a meaning associated with the spoken natural language input and then implement that meaning. For example, the SLU component may interpret audio data 211 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 211. The user recognition component 195 may perform user recognition by comparing speech characteristics, in the audio data 211, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The foregoing describes illustrative components and processing of the system 120. The following describes illustrative components and processing of the device 110. As illustrated in FIG. 2, in at least some embodiments the system 120 may receive audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 220 configured to detect a wakeword (e.g., "Alexa") that indicates to the device 110 that the audio data 211 is to be processed for determining NLU output data. In at least some embodiments, a hybrid selector 224, of the device 110, may send the audio data 211 to the wakeword detection component 220. If the wakeword detection component 220 detects a wakeword in the audio data 211, the wakeword detection component 220 may send an indication of such detection to the hybrid selector 224. In response to receiving the indication, the hybrid selector 224 may send the audio data 211 to the system 120 and/or an on-device ASR component 250. The wakeword detection component 220 may also send an indication, to the hybrid selector 224, representing a wakeword was not detected. In response to receiving such an indication, the hybrid selector 224 may refrain from sending the audio data 211 to the system 120, and may prevent the on-device ASR component 250 from processing the audio data 211. In this situation, the audio data 211 can be discarded.

The device 110 may conduct its own speech processing using on-device language processing components (such as an on-device SLU component, an on-device ASR component 250, and/or an on-device NLU component 260) similar to the manner discussed above with respect to the system-implemented ASR component 150, and NLU component 160. The device 110 may also internally include, or otherwise have access to, other components such as one or more skills 190, a user recognition component 295 (configured to process in a similar manner to the system-implemented user recognition component 195), profile storage 270 (configured to store similar profile data to the system-implemented profile storage 170), and other components. In at least some embodiments, the on-device profile storage 270 may only store profile data for a user or group of users specifically associated with the device 110. The device 110 may also include a TTS component 280 similar to the TTS component 180 described herein.

The device 110 may also include an alternative input component 240 that may be configured to perform operations similar to the alternative input component 140, and may be personalized for the user 105. The device 110 may also include a dialog management component 265 that may be configured to perform operations similar to the dialog management component 165, and may be personalized for the user 105 of the device 110. The device 110 may include interaction affinity storage 245, storing data similar to the interaction affinity storage 145. In some embodiments, the interaction affinity storage 245 may be outside of the device 110, and the device 110 may be in communication with it. The interaction affinity storage 245, in some embodiments, may store interaction affinity data for the user 105 (and other users in the user 105 household, other users associated with the user 105 account, etc.).

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 211 to pass to the system 120 while also receiving (e.g., intercepting) this audio data 211 and sending the audio data 211 to the HEC 227.

In at least some embodiments, the hybrid selector 224 may further include a local request orchestrator (LRO) 228 configured to notify the on-device ASR component 250 about the availability of the audio data 211, and to otherwise initiate the operations of on-device language processing when the audio data 211 becomes available. In general, the hybrid selector 224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 226 may allow the audio data 211 to pass through to the system 120 and the HP 226 may also input the audio data 211 to the on-device ASR component 250 by routing the audio data 211 through the HEC 227 of the hybrid selector 224, whereby the LRO 228 notifies the on-device ASR component 250 of the audio data 211. At this point, the hybrid selector 224 may wait for response data from either or both the system 120 and/or the on-device language processing components. However, the disclosure is not limited thereto, and in some examples the hybrid selector 224 may send the audio data 211 only to the on-device ASR component 250 without departing from the disclosure. For example, the device 110 may process the audio data 211 on-device without sending the audio data 211 to the system 120.

The on-device ASR component 250 is configured to receive the audio data 211 from the hybrid selector 224, and to recognize speech in the audio data 211, and the on-device NLU component 2 60 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 260) may be selected as usable to respond to a natural language input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the interaction affinity data may be represented as graph data including nodes and edges connected two nodes. An explicit affinity may be represented in the graph data as "visible node." In some embodiments, the visible nodes may correspond to a NLU hypothesis for a user input. For example, for the user input "play music by [artist] in the kitchen", the visible node may be the NLU hypothesis: {Music|<PlayIntent>|Entity Type: ArtistName|Entity: "[artist]"}. Such explicit affinity may be represented as a visible node because no or little inferencing is needed to determine the user's expressed affinity of listening to music by the indicated artist in the kitchen. In traversing the graph data, the visible nodes may be treated as a final output to be used for determining an alternative representation of the user input, for determining a recommended action, or other information corresponding to processing of the user input.

A latent affinity may be represented in the graph data as other nodes, which may be associated with a type of information conveyed by the node. For example, nodes corresponding to entities may be referred to as entity nodes, nodes corresponding to intents may be referred to as intent nodes, nodes corresponding to device types may be referred to as device type nodes, etc. Latent affinity is affinity that is not explicitly expressed by a user (e.g., within a user input), and may be derived from interactions by the user with the system 120. Latent affinities between various information may be inferred based on frequency of interactions by the user with the system 120. Examples of latent affinities inferred from interactions may be the user likes to listen to a particular type of music, the user uses a particular skill component to perform a certain actions, the user uses a particular phrase to interact with a particular device, the user experiences errors when saying a particular entity, the user has a preferred device for certain types of requests, etc. The graph data may include the following types of nodes to represent latent affinities: entity nodes, intent nodes, catalog nodes, phrase nodes, syntactic rules nodes, grammar nodes, domain nodes, device type nodes, etc.

FIG. 3 illustrates a graph building component 320 to generate the interaction affinity data 325, which may be stored in the interaction affinity storage 145. In some embodiments, the interaction affinity data may be a graphical representation of natural language interactions. The graph building component 320 may process user interaction data 302. The user interaction data 302 may correspond to a profile identifier for the user 105 and may relate to past interactions between the user 105 and the system 120. The user interaction data 302 may include interaction data representing NLU hypothesis 304, ASR hypothesis 306 and metrics 308 corresponding to a single interaction. The user interaction data 302 may include such interaction data for multiple different interactions between the user 105 and the system 120. In some cases, one or more NLU hypotheses and ASR hypotheses may be associated with a particular dialog session. The user interaction data 302 may also include other information corresponding to the interaction/dialog session, for example, device information (e.g., device id, device location, device type, etc.) for the device 110 from which the user input is received. The metrics 308 may indicate a number of times a user input corresponding to the NLU hypothesis 304 and/or the ASR hypothesis 306 is received, a number of times the corresponding user input resulted in an error, a number of times a system response to the user input resulted is user satisfaction, etc.

The graph building component 320 may process cohort interaction data 310, which may correspond to a cohort group of users corresponding to the user 105. A cohort group of users corresponding to the user 105 may include multiple users of the system 120 that may have one or more features in common with the user 105. Such features may include demographic information (e.g., age range, geographic location, job type, education level, accent, etc.), topics of interests, skill usage, amount of interactions with the system 120, and other information. The system 120 may determine the cohort group of users corresponding to the user 105, and retrieve the cohort interaction data 310 using profile identifiers for the cohort group of users. The cohort interaction data 310 may relate to past interactions between the cohort group of users and the system 120. The cohort interaction data 310 may include interaction data representing NLU hypothesis 312, ASR hypothesis 314 and metrics 316 corresponding to a single interaction. The cohort interaction data 310 may include such interaction data for multiple different interactions between a cohort group of users and the system 120. In some cases, one or more NLU hypotheses and ASR hypotheses may be associated with a particular dialog session. The cohort interaction data 310 may also include other information corresponding to the interaction/dialog session, for example, device information (e.g., device id, device location, device type, etc.) for the device 110 from which the user input is received. The metrics 316 may indicate a number of times a user input corresponding to the NLU hypothesis 312 and/or the ASR hypothesis 314 is received, a number of times the corresponding user input resulted in an error, a number of times a system response to the user input resulted is user satisfaction, etc.

The graph building component 320 may process the user interaction data 302 and the cohort interaction data 310 separately or simultaneously. The graph building component 320 may first determine a number of times a NLU hypothesis 304 exists in the user interaction data 302 (i.e. a number of times a user input corresponding to the NLU hypothesis is received by the system 120). The graph building component 320 may also determine a number of times an ASR hypothesis 306 exists in the user interaction data 302 (i.e. a number of times the same user input is received by the system 120).

The graph building component 320 may then determine other data (latent data) corresponding to the NLU hypothesis 304, such as, an entity included in the NLU hypothesis 304, an intent included in the NLU hypothesis 304 and a domain corresponding to the NLU hypothesis 304. The graph building component 320 may also determine other data (latent data) corresponding to the ASR hypothesis 306, such as, grammar information for the user input. Grammar information may indicate a sentence structure for the user input, such as, relative placement of a subject, an object, and a verb in the user input. Grammar information may also indicate a tense for the user input (e.g., past tense, present tense, future tense, etc.). The graph building component 320 may also determine syntax information for the user input, using the ASR hypothesis 306. Syntax information may indicate a formality level of the user input (e.g., a casual form of input, a formal form of input, etc.). Syntax information may indicate a form of the user input (e.g., sentence, question, command-like, etc.).

The graph building component 320 may determine similar type of information by processing the cohort interaction data 310.

The graph building component 320 may determine a graph that includes nodes corresponding to the various information derived from the user interaction data 302 and the cohort interaction data 310. FIG. 4 illustrates example data 400 that may be included in the interaction affinity data 325. As shown, the interaction affinity data 325 may include a NLU hypothesis node 402, an entity node 404, an intent node 408, a device type node 406, a domain node 410, a syntax node 412, and a grammar node 414. Each of the illustrated nodes may include or may be associated with other nodes corresponding to particular instances of the information. For example, as shown in FIG. 5, the NLU hypothesis node 402 may include one or more NLU hypothesis nodes 502, 504, 506, each of which may correspond to a particular NLU hypothesis included in the user interaction data 302 and the cohort interaction data 310. As shown in FIG. 5, the intent node 406 may include one more intent nodes 510, 512, each corresponding to a particular intent included in the user interaction data 302 and the cohort interaction data 310. The entity node 404 may include one or more entity nodes 514, 516, 518, each corresponding to a particular entity included in the user interaction data 302 and the cohort interaction data 310. The NLU hypothesis nodes 402 may be visible nodes representing an explicit affinity expressed by the user(s). The user(s) may express an explicit affinity by providing a user input. The entity node 404, the intent node 408, the device type node 406, the domain node 410, the syntax node 412, the grammar node 414 (and other nodes that may be represented in the interaction affinity data 325) may represent latent affinities derived from multiple different user inputs provided by the user(s) to the system 120. In some embodiments, the visible nodes 402 may include a generation node 505 described in detail below.

In some embodiments, the graph data may be stored in the interaction affinity storage 145 using a table format including one or more related tables. One table may store data corresponding to the nodes, and another table may store data corresponding to the edges. The fields in the tables may include the data of the node and the edge. The tables may include what edges each node is connected to, and what node each edge is connected to.

In some embodiments, the interaction affinity storage 145 may store a first graph(s) representing interaction affinity data for the user 105 and associated with a first profile identifier for the user 105. The interaction affinity storage 145 may store a second graph(s) representing interaction affinity data for another user and associated with a second profile identifier. In other embodiments, the system 100 may include separate interaction affinity storages, each storing interaction affinity data for separate different users.

As shown in FIG. 4, each of the different types of information may be connected to each other. The graph building component 320 may determine a type of affinity between the different types of information. The types of affinity may be co-occurrence, rephrase, recommendation, and cohort. A co-occurrence affinity type may be based on the pieces of information being present in the same user input or in the same dialog session. A rephrase affinity type may be based on the pieces of information being present in a pair of user inputs, where the first user input may be an initial input and the subsequent user input may be a rephrase or a repeat of the initial user input. A recommendation affinity type may be based on the system recommended an action to the user in response to a user input, and the user confirming performance of the recommended action. In some embodiments, the co-occurrence, rephrase and recommendation affinity types may be based on interaction data for a specific user. A cohort affinity type may be based on interaction data for other users that may be similar to the user. As shown in FIG. 5, the graph building component 320 may determine an affinity type between two nodes, and may include a label corresponding to the affinity type with the edge connecting the two nodes.

Figure 6A:
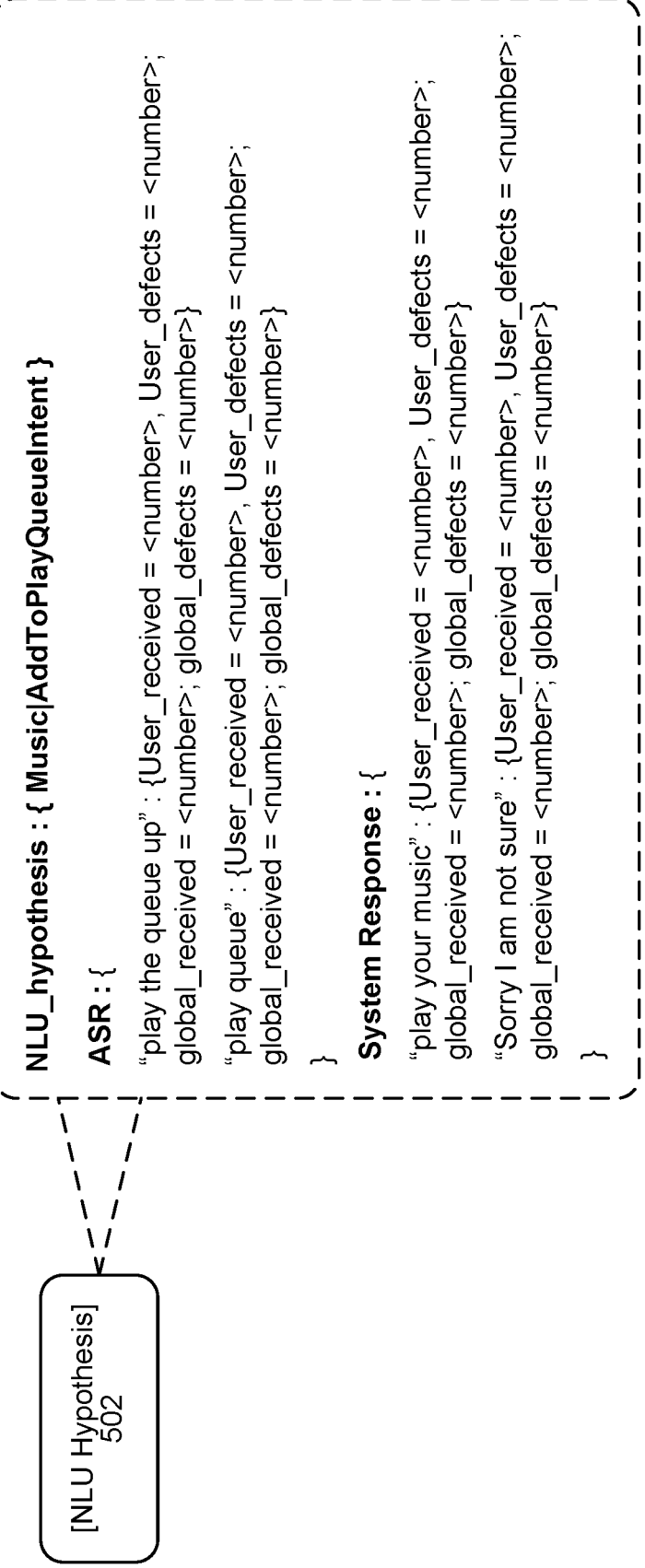
FIGS. 6A-6B illustrate example data included in the interaction affinity data, according to embodiments of the present disclosure.

FIG. 6A illustrates example data that may be included in the NLU hypothesis node 502. As shown, the NLU hypothesis node 502 may include a particular NLU hypothesis: {Music|AddToPlayQueueIntent} (domain and intent corresponding to the NLU hypothesis). The NLU hypothesis node 502 also includes ASR data representing user inputs corresponding to the NLU hypothesis of the node 502. As shown in FIG. 6A, the NLU hypothesis node 502 may include some metrics a number of times (user_received) the user input is received by the user 105, a number of times (user_defects) the user input resulted in a defect for the user 105, a number of times (global_received) the user input is received by the system 120 from multiple different users (including the user 105), and a number of times (global_defects) the user input resulted in a defect for the multiple users. A user input may result in a defect when the system 120 outputs a undesired response to the user input. The NLU hypothesis node 502 may also include system response data representing a system response for the NLU hypothesis. As shown in FIG. 6A, the NLU hypothesis node 502 may include a number of times the system response is presented to the user 105, a number of times the system response resulted in a defect for the user 105, a number of times the system response is presented to multiple different users (including the user 105), and a number of times the system response resulted in a defect for the multiple users.

Figure 6B:
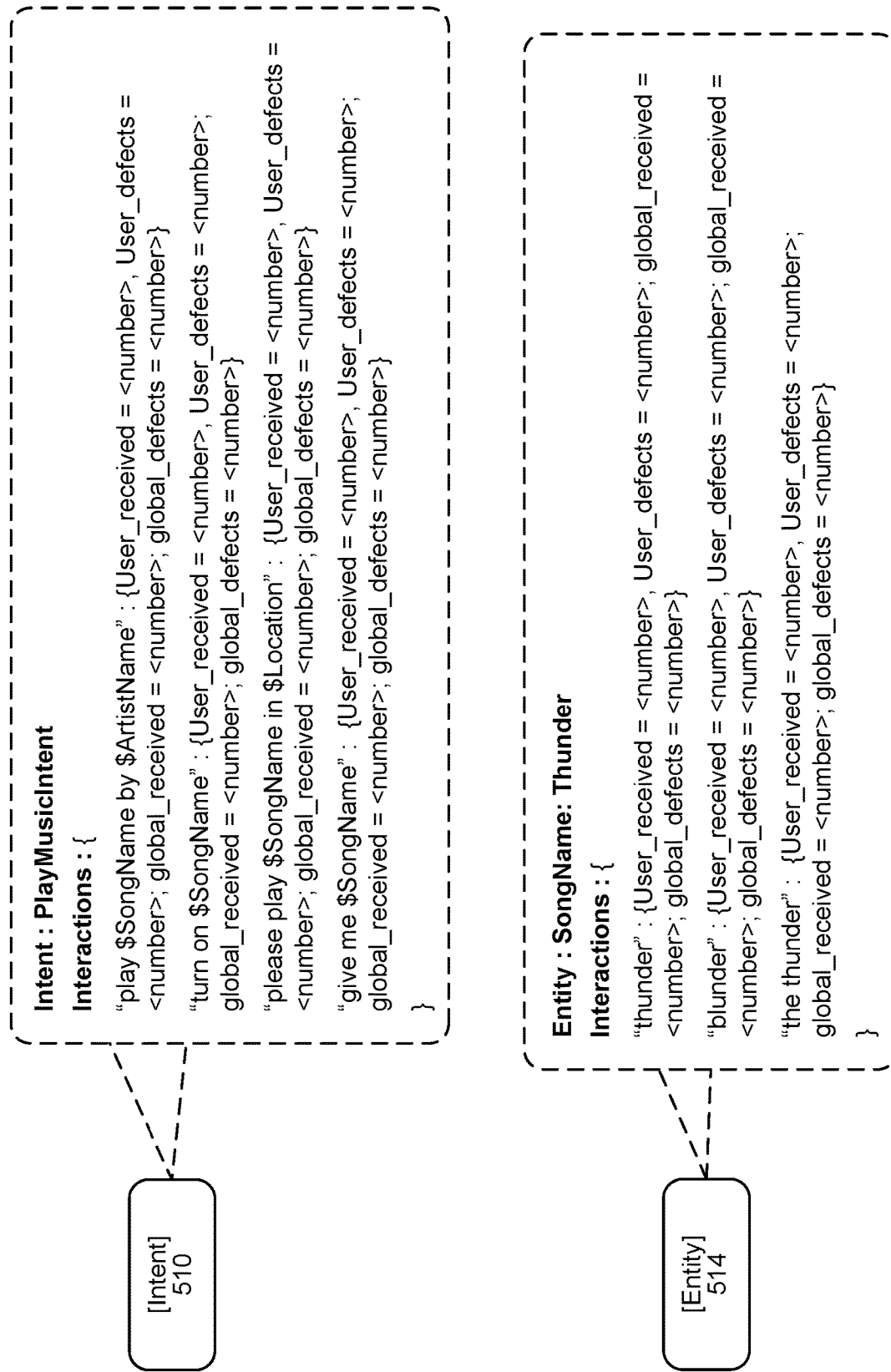

FIG. 6B illustrates example data that may be included in the intent node 510. As shown, the intent node 510 may include a particular intent: PlayMusicIntent. The intent node 510 may also include interaction information indicating the user input received by the system 120 that correspond to this particular intent. The user inputs may include the entity name in a tokenized representation. For example, as shown, one user input may be included as "play $SongName by $ArtistName," where $SongName and $ArtistName are tokenized representation of the entities included in the user input. The tokenized representation may indicate to the system 120 which entity type is included in the user input, but not the particular entity name. As shown in FIG. 6B, the intent node 510 may also include some metrics representing a number of times (user_received) the user input is received from the user 105, a number of times (user_defects) the user input resulted in a defect for the user 105, a number of times (global_received) the user input is received by the system 120 from multiple different users (including the user 105), and a number of times (global_defects) the user input resulted in a defect for the multiple users. As shown in FIG. 6B, multiple different user inputs may be included in the intent node 510, illustrating multiple different ways a user may provide an input corresponding to this particular intent.

FIG. 6B also illustrates example data that may be included in the entity node 514. As shown, the entity node 514 may include a particular entity: SongName: Thunder (where SongName indicates the entity type, and Thunder indicates the entity name). The entity node 514 may also include interaction information representing how the entity is included in user inputs. As shown, the entity node 514 may include "thunder", "blunder", and "the thunder" indicating the different ways this particular entity is provided in a user input. As shown in FIG. 6B, the entity node 514 may also include some metrics a number of times (user_received) the user input is received from the user 105, a number of times (user_defects) the user input resulted in a defect for the user 105, a number of times (global_received) the user input is received by the system 120 from multiple different users (including the user 105), and a number of times (global_defects) the user input resulted in a defect for the multiple users.

Although FIGS. 3-5 illustrate a technique for representing the interaction affinity data in a graph form, it should be understood that other techniques may be used to process the user interaction data 302 and the cohort interaction data 310 to generate the interaction affinity data 325.

The graph traversal component 142, 167 (described above in relation to FIGS. 1A and 1B) may use one or more techniques to traverse the interaction affinity data. In some embodiments, the graph traversal component 142, 167 may use the Equation 1 described below. The interaction affinity data may include N affinity data types (e.g., entities, intents, device type, etc.), where each affinity data type has its own subset of size n. The nodes may be represented as $z^{n*k}$, where n is in N and k. Similarly, $y_i$ contains metrics data for the node $$P(v|u) = \Sigma_{k \in K} P(v|\text{Path}_k, u) P(\text{Path}_k|u) \qquad \text{Equation(1)}$$

where each $\text{Path}_k$ is a path in the index graph that can reach to the "visible node" v from any latent affinity node (the visible node may be the NLU hypothesis node, and the latent affinity node may be the other nodes). For example, an entity node "ArtistName: imagine dragon" to an intent node "Music|PlayMusicIntent" is a path that leads to a NLU hypothesis node "Music|PlayMusicIntent|ArtistName: imagine dragon".

The graph may include an indication of the visible nodes (output nodes), such that each node arrived at using Equation 1 represents a rewrite or recommendation candidate. N latent affinity types are defined, where $Z_1, Z_2, \ldots Z_N$, where each latent variable has its own subsets of size $Z_n$. These nodes are represented in the latent affinity space as $z_k^n$ where n is in N and k is in $Z_n$. Similar to $y_i$ in V, $z_k^n$ also contains its associated metadata. For example, for "entity affinity node", the metadata can contain entity mentions, impressions, accumulated user feedback data, etc., for "intent affinity node", the metadata can contain "mentions" in the form of entity-normalized carry phrase corresponding to each intent, template for request construction, etc. The "mentions" for each latent affinity node is referred to as $m_k^n$. These mentions may be used for model/graph training and inferencing.

In some embodiments, the graph traversal component 142, 167 may use multi-hop reasoning to traverse the interaction affinity data. Given a training set of D, the training loss is optimized as shown in the below equation, where u is the given request/user input from the user 105 upon which an inference, using the interaction affinity graph data will be performed, and v is the ground-truth visible node.

$$\text{objective function} = \Sigma_{(v,u) \in D} \log P(v|u) \qquad \text{Equation(2)}$$

During the reasoning process, a latent path may be generated through multi-hop graph walking. Each hop may look into a specific given latent affinity node (e.g. entity, intent, device-type, etc.) and after completing the walking process, the probability of P(v|u) will be calculated by aggregating all the path probabilities that can lead to v. Each path in the reasoning process can be represented as $z_1, z_2, \ldots z_N$, where $z_1 \in Z_1, z_2 \in Z_2, \ldots, z_N \in Z_N$, and so on. Each $Z_n$ represents a latent affinity type and the N is the total number of latent affinity types included in the interaction affinity data 325. For example, the $P(z_0|u)$ will be the probability that the entity of $z_0$ can be found in request u and the last hop will be the predicted probability of a v from visible nodes given the request u and the previous graph walking path $z_1, z_2, \ldots z_{N-1}$.

Given the request u, the probability of a given node $z_t$ in the reasoning path may be as follows:

$$P(z_t|u) = \Sigma_{z_{t-1} \in Z_{t-1}} P(z_t|u, z_{t-1}) P(z_{t-1}|u) \qquad \text{Equation(3)}$$

Note there may be multiple "mentions" in the latent affinity node. For example, for the entity node, this can be various aliases that the user used during interactions with the system 120. For the intent node, this can be various carry phrase that the user used to trigger the intent, for example, "play", "turn on" for <PlayMusicIntent>. In order to incorporate the "mentions", the Equation (3) above is may be further expanded as follows:

$$P(z_t|u) = \Sigma_{m \in Z_t} \Sigma_{z_{t-1} \in Z_{t-1}} P(z_t|m) P(m|u, z_{t-1}) P(z_{t-1}|u) \qquad \text{Equation (4)}$$

There are different training algorithms in order to optimize the parameters given the loss function, for example, completely differentiable optimization through cross entropy, variational approximation through ELBO, reinforce-based walking-policy optimization, etc. These training methods differ mainly in how the negative samples are generated for posterior probability estimation and how the loss function is constructed. In some embodiments, a fully differentiable model architecture may be employed. In particular, the following equation may be used to formulate the posterior probability of $Z_t$. The $A_{z_{t-1} \to Z_t \to M_t}$ contained by edge connection multiplied by sparse matrix multiplication that further expands the space from $Z_t$ to $M_t$ to model the co-occurrence. The $T_k(s_t(m, z_{t-1}, u))$ denote the top-K relevant mentions encoded as a sparse vector. The aggregation of mentions to the latent affinity type can be formulated as multiplication with another sparse-matrix $B_{M_t \to Z_t}$.

$$Z_t = [P(z_1|u), P(z_2|u), \ldots P(z_M|u)] \qquad \text{Equation (5)}$$

$$Z_t = \text{softmax}([Z_{t-1}{}^T A_{Z_{t-1} \to Z_t \to M_t} \odot T_k(s_t(m, z_{t-1}, u))] B_{M_t \to Z_t}) \qquad \text{Equation (6)}$$

A neural encoder may be used to get the top-K relevant mentions shown in Equation (7) below. The F(m,r) is an encoder for mentions as well as edges and the $G_{Z_{t-1}}$ is an encoder for the $Z_{t-1}$ for the request u. The encoder can be a pretrained LM (e.g. BERT, RoBERTa, etc.) or may be trained from scratch.

$$s_t(m, z_{t-1}, u) \propto \exp(F(m,r) \cdot G_{Z_{t-1}}(u)) \qquad \text{Equation (7)}$$

During inferencing, beam search can be considered to prune the path that has low probability for calculation efficiency. The graph walking process is referred to as "reasoning" because the model provides a final ranking score after measuring the request in various granularity captured in the latent affinity space. For example when the system 120 "hears" a user say "put soda to my playlist" (ASR error of soda instead of thunder), the "add [x] to my playlist" and "thunder" will be picked up separately for <AddToPlaylistIntent> and <SongName: thunder> and increase the probability of triggering an alternative input representation of "add thunder to my playlist" rather then routing to <ToDoIntent>. But if the system 120 hears a user says "buy me soda", likely an alternative input representation of "add thunder to my playlist" won't be triggered due to the low likelihood of matching "buy me" to carry phrases captured in <AddToPlayListIntent>. With the introduction of the latent affinity node, the opportunity to fix errors increases.

Due to the interaction affinity data providing information at different granularity levels, and introduction of the reasoning process at different granularity, the present system has the capability to fix user inputs that result in undesired responses while no similar or corresponding non-defect user input has been received before. For example, if the user input is "play soda in son's room" (the intention is to play "thunder" in sam's room), the present system, using the interaction affinity data, can determine that an alternative input representation by modifying "soda" to "thunder" and "son's room" to "sam's room." In this case, a high probability for $P(Path_k|u)$ is observed, but given the absence of the visible node/NLU hypothesis "Music|PlayMusicIntent|SongName: thunder|DeviceLocation: Sam's room" in past interaction data, it may still be difficult to determine "play thunder in sam's room" as the alternative input representation of "play soda in son's room". To tackle this issue, the interaction affinity data may include a different node type along with the original 'visible node' (NLU hypothesis). This node may be referred to as the "generation node" (e.g., the generation node 505 shown in FIG. 5).

For the generation node, instead of outputting the visible node at the end of a traversed path (e.g., NLU hypothesis), there are fields that need to be filled. An example generation node may be:
generation_node: {
  Intent: PlayMusicIntent,
  SongName: TO_BE_FILL,
  DeviceLocation: TO_BE_FILL,
  Alternative Input Representation: play $SongName in $DeviceLocation}

The generation node 505 may be a generalized representation of a past interaction (e.g. Music|PlayMusicIntent|SongName: $ SongName|DeviceLocation: $DeviceLocation) derived from the predefined affinity nodes (e.g. entity node and intent node). Also the generation node may not be limited to only entity or intent as shown above, but can be generalized to any type of affinity nodes such as syntax, grammar, etc. The introduction of a "generation node" decomposes the intention prediction process (ranking process) according to the reasoning process described above while constraining generation in alignment with various past interactions from the user 105 or other users. For the generation node g and the to-be filled latent affinity entity nodes $e_1 \ldots e_K$, v can be obtained by:

$$v = \text{Generation\_Func}(g, D_{e1}, D_{e2}, \ldots, D_{eK}) \quad \text{Equation (8)}$$

where the $D_{ei}$ denotes the top-1 relevant user inputs normalized for the latent affinity i given user input u. For example, given request "turn on the song soda," "play" will be the normalized form the top-1 relevant carry phrase "turn on" in "PlayMusicIntent", and "thunder" will be the normalized form for the top-1 relevant entity in "SongName: thunder". The "Generation_Func" above in Equation 8 can be simple template filling as shown above, a context free grammar (CGF) technique, a decoder, a full seq-to-seq generaion model, or other techniques.

Now an example adding a node, such as, an entity node based on cohort interaction data and using such node is described. For example an entity node corresponding to a first song by a first artist for the user 105 who has a preference for the first artist derived from cohort interaction data. A song as the same name as the first song may also exist by a second artist, however, a preference for the first artist is determined for the user 105 using cohort interaction data and the user interaction data (i.e. the user 105 has a preference for the first artist and cohort group of users have a preference for the first artist and the first song). The entity node "SongName: first song" is added to the interaction affinity data and connected to the entity node "ArtistName: first artist" to indicate preference (from cohort learning at entity level). The entity node "SongName: first song" is also connected to the intent node "PlayMusicIntent" and the intent node "AddToPlayListIntent". When the user 105 provides a user input "play first song", that has not been seen/included in his/her interaction history, the system will respond on the "generation node" through the reasoning process that rewrites "play first song" into "play first song by first artist", thus, generating the desired response to the user input. An undersized response in this example may be output of the first song by the second artist (since the user input does not specify an artist name).

Now adding a node, such as an entity node, to incorporate new information/data is described. For example, an entity node corresponding to an upcoming new song release (second song) by an artist may be added. The interaction affinity data may indicate the user 105 having a preference for the artist. An entity node "SongName: second song" may be added to the interaction affinity data and may be connected to an entity node "ArtistName: artist." The entity node "SongName: second song" may also be connected to an intent node "PlayMusicIntent" and an intent node "AddToPlayQueueIntent." For the user input "play second song" after the second song is released, the system will respond using "play second song by artist" as the alternative input representation. Any ASR processing errors relating to understanding the second song may also be corrected using the interaction affinity data. Such errors may not be corrected using traditional techniques that rely on past interaction data for the user 105, since the second song is a new song release that would not appear in the user's interaction history.

Figure 7:
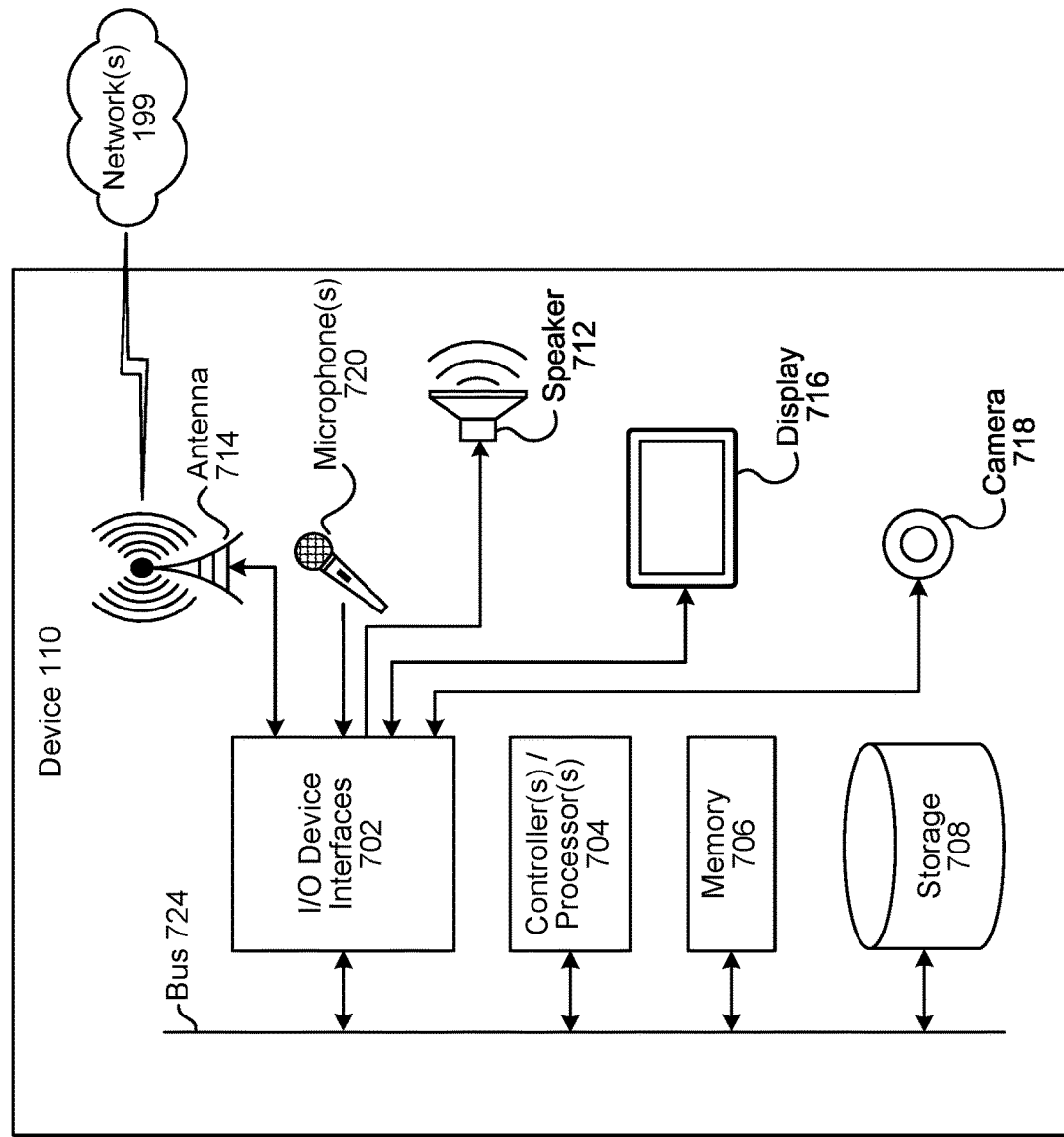
FIG. 7 is a block diagram conceptually illustrating example components of a device, according to embodiments of the present disclosure.
Figure 8:
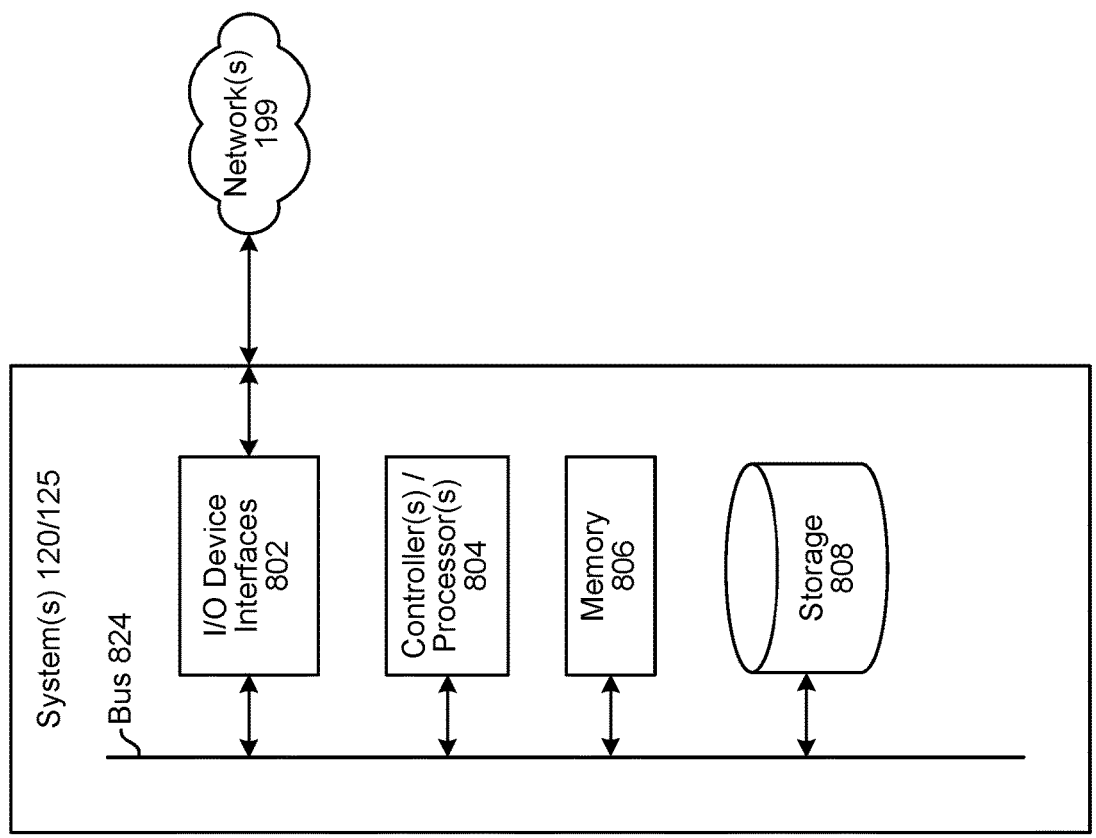
FIG. 8 is a block diagram conceptually illustrating example components of a system, according to embodiments of the present disclosure.

FIG. 7 is a block diagram conceptually illustrating a device 110 of the system 100. FIG. 8 is a block diagram conceptually illustrating example components of a system, such as the system 120, and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (702/802), processor(s) (704/804), memory (706/806), and/or storage (708/808) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill system 125, as described herein, are illustrative, and may be located as a stand-alone device or may be included, in whole or in part, as a component of a larger device or system.

Figure 9:
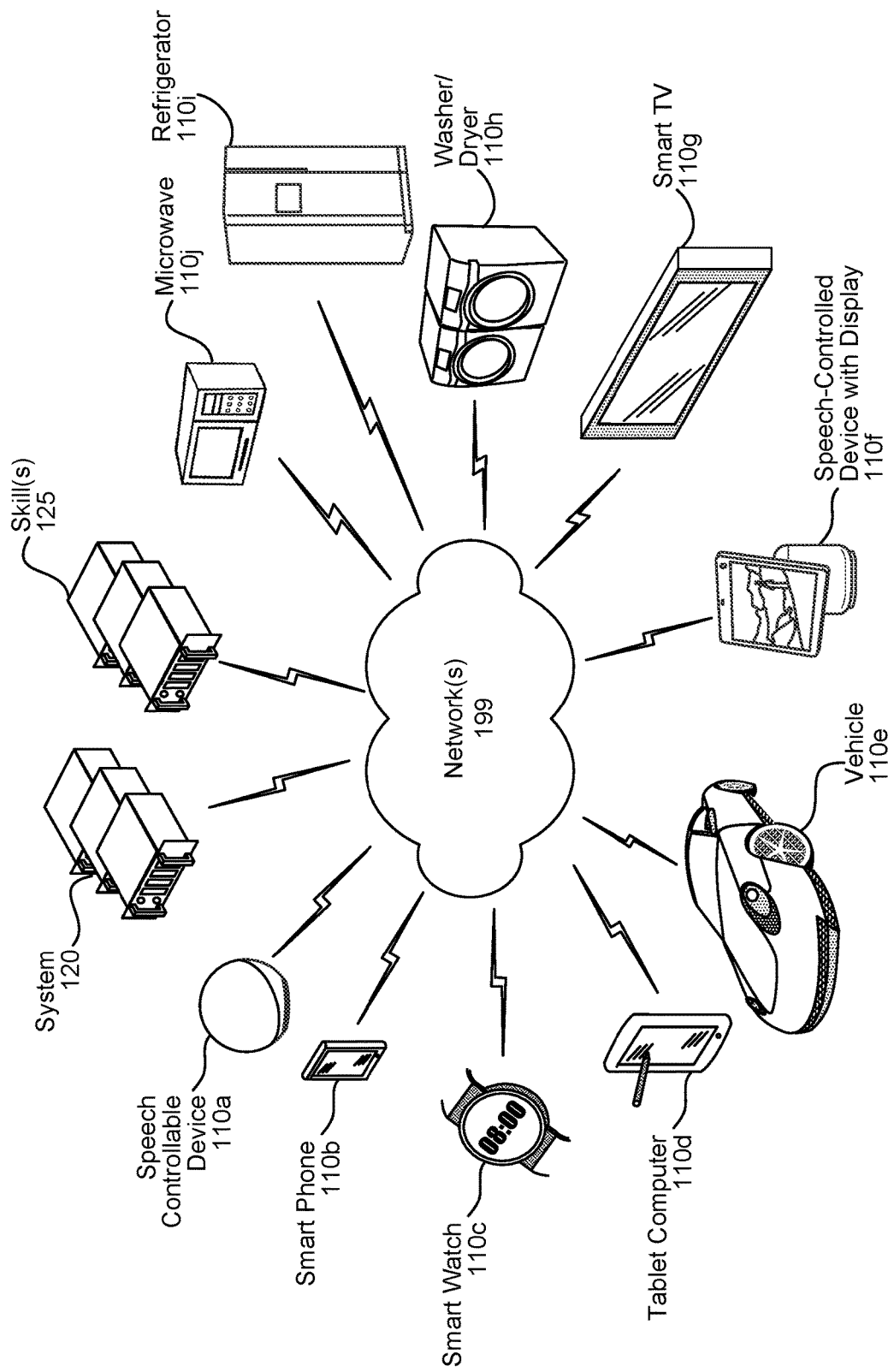
FIG. 9 illustrates an example of a computer network for use with the overall system, according to embodiments of the present disclosure.

As illustrated in FIG. 9, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving first data corresponding to past natural language interactions associated with a profile identifier, the first data including a plurality of natural language understanding (NLU) hypotheses;
    determining, using the first data, a first latent affinity between a first intent included in a first NLU hypothesis of the plurality of NLU hypotheses and a first entity included in the first NLU hypothesis;
    determining, using the first data, a second latent affinity between the first intent and a second intent, the second intent included in a second NLU hypothesis of the plurality of NLU hypotheses, wherein the second latent affinity is based at least in part on the first NLU hypothesis corresponding to a first user input and the second NLU hypothesis corresponding to a second user input received subsequent to the first user input;
    determining second data corresponding to a graphical representation of natural language interactions, the second data representing a first node corresponding to the first intent, a second node corresponding to the first entity, and a third node corresponding to the second intent;
    determining the second data to represent a first edge connecting the first node and the second node based on the first latent affinity;
    determining the second data to represent a second edge connecting the first node and the third node based on the second latent affinity;
    receiving, from a device, first audio data corresponding to a first spoken natural language input;
    determining first automatic speech recognition (ASR) data corresponding to the first audio data;
    determining first NLU data using the first ASR data, the first NLU data including the first intent, the first entity and a confidence score;
    determining, using the confidence score, that processing of the first NLU data will result in an undesired response to the first natural language spoken input;
    determining, using the second data, the first ASR data and the first NLU data, an alternative input representation for the first spoken natural language input, the alternative input representation corresponding to the second intent and the first entity;
    determining first output data corresponding to the alternative input representation; and
    sending, to the device, the first output data in response to the first spoken natural language input.

2. The computer-implemented method of claim 1, further comprising:
    receiving, from the device, second audio data corresponding to a second spoken natural language input;
    determining second ASR data corresponding to the second audio data;
    determining second NLU data using the second ASR data, the second NLU data including the first intent and the first entity;
    determining, using the second data, the second ASR data and the second NLU data, a recommended action corresponding to the second spoken natural language input, the recommended action corresponding to the second intent;
    determining, using the second NLU data, second output data responsive to the second spoken natural language input;
    determining, using the recommended action, third output data requesting confirmation to perform the recommended action; and
    sending, to the device, the second output data and the third output data.

3. The computer-implemented method of claim 1, further comprising:
    determining that a third NLU hypothesis of the plurality of NLU hypotheses corresponds to a third user input that was provided as a rephrased input for the first user input;
    determining a second entity included in the third NLU hypothesis;
    determining a third latent affinity between the first entity and the second entity;
    determining, based on the third user input being a rephrased input for the first user input, that the third latent affinity is a rephrase affinity type;
    determining the second data to represent a fourth node corresponding to the second entity; and
    determining the second data to represent a third edge connecting the fourth node and the second node, the third edge associated with an indication corresponding to the rephrase affinity type.

4. The computer-implemented method of claim 1, further comprising:
   determining a first number representing a number of times the first user input is received;
   determining the first latent affinity based on the first number;
   determining a second number representing a number of times the second user input is received subsequent to the first user input; and
   determining the second latent affinity based on the second number.

5. A computer-implemented method comprising:
   receiving first data including a plurality of natural language understanding (NLU) hypotheses corresponding to past natural language interactions;
   determining, using the first data, a first NLU hypothesis corresponding to a first intent and a first entity;
   determining a number of times a first natural language input corresponding to the first NLU hypothesis has been received;
   determining, using the first data and the number of times, second data indicating at least a first affinity between the first intent and the first entity;
   receiving audio data representing a spoken natural language input;
   determining, using the second data, an alternative input representation corresponding to the spoken natural language input;
   determining output data corresponding to the alternative input representation; and
   causing presentation of the output data in response to the spoken natural language input.

6. The computer-implemented method of claim 5, further comprising:
   determining a second affinity between the first intent and the first entity based on the first intent being included in the first NLU hypothesis of the plurality of NLU hypotheses and the first entity being included in a second NLU hypothesis of the plurality of NLU hypotheses.

7. The computer-implemented method of claim 6, wherein determining the second data comprises:
   determining a first user input corresponding to the first NLU hypothesis and a second user input corresponding to a second NLU hypothesis of the plurality of NLU hypotheses;
   determining that the second user input is received subsequent to the first user input; and
   determining a second affinity between the first intent and a second entity included in the second NLU hypothesis based on the second user input being subsequent to the first user input.

8. The computer-implemented method of claim 5, further comprising:
   receiving input data corresponding to a second natural language input;
   determining, using the input data, a second intent and a second entity corresponding to the second natural language input;
   determining, using the second data, a recommended action corresponding to the second natural language input;
   determining, using the second intent and the second entity, second output data responsive to the second natural language input;
   determining, using the recommended action, third output data requesting confirmation to perform the recommended action; and
   causing presentation of the second output data and the third output data.

9. The computer-implemented method of claim 8, further comprising:
   determining that the second data indicates a second affinity between the first intent and a second intent, the second affinity being implicitly represented in the first data; and
   determining the recommended action corresponding to the second intent.

10. The computer-implemented method of claim 5, further comprising:
    determining a second intent corresponding to the spoken natural language input;
    wherein determining the alternative input representation comprises:
       determining that the second data indicates a second affinity between the first intent and the second intent, the second affinity being implicitly represented in the first data; and
       determining the alternative input representation corresponding to the first intent.

11. The computer-implemented method of claim 5, further comprising:
    receiving the first data associated with a first profile identifier and a second profile identifier, the spoken natural language input being associated with the first profile identifier, and
    determining the first affinity based on implicit information represented in the first data.

12. A system comprising:
    at least one processor; and
    at least one memory including instructions that, when executed by the at least one processor, cause the system to:
       receive first data including a plurality of natural language understanding (NLU) hypotheses corresponding to past natural language interactions;
       determine, using the first data, a first NLU hypothesis corresponding to a first intent and a first entity;
       determine a number of times a first natural language input corresponding to the first NLU hypothesis has been received;
       determine, using the first data and the number of times, second data indicating at least a first affinity between the first intent and the first entity;
       receive audio data representing a spoken natural language input;
       determine, using the second data, an alternative input representation corresponding to the spoken natural language input;
       determine output data corresponding to the alternative input representation; and
       cause presentation of the output data in response to the spoken natural language input.

13. The system of claim 12, wherein the instructions that, when executed by the at least one processor, cause the system to:
    determine second affinity between the first intent and the first entity based on the first intent being included in the first NLU hypothesis of the plurality of NLU hypotheses and the first entity being included in a second NLU hypothesis of the plurality of NLU hypotheses.

14. The system of claim 13, wherein the instructions that, when executed by the at least one processor, cause the system to determine the second data, further causes the system to:
- determine a first user input corresponding to the first NLU hypothesis and a second user input corresponding to a second NLU hypothesis of the plurality of NLU hypotheses;
- determine that the second user input is received subsequent to the first user input; and
- determine a second affinity between the first intent and a second entity included in the second NLU hypothesis based on the second user input being subsequent to the first user input.

15. The system of claim 12, wherein the at least one memory includes further instructions that, when executed by the at least one processor, further cause the system to:
- receive input data corresponding to a second natural language input;
- determine, using the input data, a second intent and a second entity corresponding to the second natural language input;
- determine, using the second data, a recommended action corresponding to the second natural language input;
- determine, using the second intent and the second entity, second output data responsive to the second natural language input;
- determine, using the recommended action, third output data requesting confirmation to perform the recommended action; and
- cause presentation of the second output data and the third output data.

16. The system of claim 15, wherein the at least one memory includes further instructions that, when executed by the at least one processor, further cause the system to:
- determine that the second data indicates a second affinity between the first intent and a second intent, the second affinity being implicitly represented in the first data; and
- determine the recommended action corresponding to the second intent.

17. The system of claim 12, wherein the at least one memory includes further instructions that, when executed by the at least one processor, further cause the system to:
- determine a second intent corresponding to the spoken natural language input;
- determine that the second data indicates a second affinity between the first intent and the second intent, the second affinity being implicitly represented in the first data; and
- determine the alternative input representation corresponding to the first intent.

18. The system of claim 12, wherein the at least one memory includes further instructions that, when executed by the at least one processor, further cause the system to:
- receive the first data associated with a first profile identifier and a second profile identifier, the spoken natural language input being associated with the first profile identifier; and
- determine the first affinity based on implicit information represented in the first data.

* * * * *